US012647017B1

(12) United States Patent
Cheng et al.

(10) Patent No.: US 12,647,017 B1
(45) Date of Patent: Jun. 2, 2026

(54) POWER SUPPLY AND OPERATION METHOD THEREOF

(71) Applicant: Chicony Power Technology Co., Ltd., New Taipei (TW)

(72) Inventors: Hung Wen Cheng, New Taipei City (TW); Tso-Jen Peng, New Taipei City (TW); Ssu-Hao Wang, New Taipei City (TW)

(73) Assignee: Chicony Power Technology Co., Ltd., New Taipei City (TW)

( * ) Notice: Subject to any disclaimer, the term of this patent is extended or adjusted under 35 U.S.C. 154(b) by 0 days.

(21) Appl. No.: 19/224,908

(22) Filed: Jun. 2, 2025

(30) Foreign Application Priority Data

Apr. 16, 2025 (TW) ................................. 114114472

(51) Int. Cl.
*H02M 1/00* (2007.01)
*H02M 7/217* (2006.01)

(52) U.S. Cl.
CPC ......... *H02M 1/0067* (2021.05); *H02M 7/217* (2013.01)

(58) Field of Classification Search
CPC .................................................. H02M 1/0067
See application file for complete search history.

(56) References Cited

U.S. PATENT DOCUMENTS

| 7,224,085 B2 | 5/2007 | Chen et al. |
| 7,227,277 B2 | 6/2007 | Chapman et al. |
| 8,159,200 B2 | 4/2012 | Lesso et al. |
| 8,351,230 B2 | 1/2013 | Nishihara et al. |
| 9,425,704 B2 | 8/2016 | Burkard et al. |
| 11,888,404 B2 | 1/2024 | Kumar et al. |
| 11,990,848 B1 | 5/2024 | Vinciarelli |
| 2011/0260631 A1* | 10/2011 | Park ...................... H05B 45/39 |
| | | 315/165 |
| 2013/0314948 A1* | 11/2013 | Perreault ............... H02M 7/497 |
| | | 363/8 |
| 2014/0169046 A1* | 6/2014 | Chen ................... H02M 1/4225 |
| | | 363/39 |
| 2016/0329813 A1* | 11/2016 | Wu .................... H02M 3/33507 |
| 2017/0079099 A1* | 3/2017 | Wu ........................ H05B 45/382 |
| 2017/0308152 A1* | 10/2017 | Trichy .................. G06F 1/3234 |

(Continued)

FOREIGN PATENT DOCUMENTS

| CN | 104811020 A | 7/2015 |
| CN | 113676055 A | 11/2021 |

(Continued)

*Primary Examiner* — Daniel Kessie
(74) *Attorney, Agent, or Firm* — CKC & Partners Co., LLC

(57) ABSTRACT

A power supply includes a converter circuit, a switching circuit and a control circuit. The converter circuit includes a transformer, a primary side switch and a secondary side switch. The switching circuit includes first and second capacitors, first and second sets of switches. In a first phase, the primary side switch is in the conduction state, causing a magnetizing inductor of the transformer to store energy. In a second phase, the primary side switch is in the off state, causing the magnetizing inductor to release the energy. In a first mode of the second phase, a first amount of the energy is transferred through the first set of switches to the first capacitor. In a second mode of the second phase, a second amount of energy is transferred to the second capacitor through the second set of switches.

15 Claims, 14 Drawing Sheets

100

(56)　　　　　　References Cited

U.S. PATENT DOCUMENTS

| | | |
|---|---|---|
| 2018/0054868 A1 | 2/2018 | Yan et al. |
| 2021/0399624 A1* | 12/2021 | Brown .................... B60L 53/22 |
| 2022/0321016 A1* | 10/2022 | Khaligh ................. H02M 1/10 |
| 2023/0107411 A1* | 4/2023 | Bucheru ................ H02M 7/06 |
| | | 363/126 |
| 2023/0231392 A1 | 7/2023 | Xue |
| 2023/0275451 A1* | 8/2023 | Taguchi ................... H02J 7/06 |
| | | 320/129 |
| 2024/0312433 A1* | 9/2024 | Kim ........................ G09G 3/32 |
| 2024/0334569 A1* | 10/2024 | Archer ............... H05B 45/375 |

FOREIGN PATENT DOCUMENTS

| | | |
|---|---|---|
| TW | 200838358 A | 9/2008 |
| TW | 201304598 A | 1/2013 |
| TW | 201731203 A | 9/2017 |
| TW | 202230925 A | 8/2022 |
| TW | I796859 B | 3/2023 |

* cited by examiner

POWER SUPPLY AND OPERATION METHOD THEREOF

CROSS-REFERENCE TO RELATED APPLICATION

This application claims priority to Taiwan Application Serial Number 114114472, filed Apr. 16, 2025, which is herein incorporated by reference in its entirety.

BACKGROUND

Field of Invention

The present invention relates to a power supply. More particularly, the present invention relates to a power supply and an operation thereof capable of providing multi-port outputs.

Description of Related Art

Power supplies or chargers with multiple output ports can charge more devices at the same time. In some cases, the chargers with the multiple output ports are often implemented by converter architectures with multiple stages. The converter architecture with multiple stages is, such as, an architecture composed of an AC to DC converter and two buck converters, an architecture composed of an AC to DC converter and a buck boost converter or an architecture composed of two AC to DC converters. However, the converter architecture with multiple stages usually has more cores, more capacitors and/or more secondary switches, which may lead to larger volume and more losses.

Therefore, how to solve the above problems is an important issue in this field.

SUMMARY

The present disclosure provides a power supply. The power supply includes a converter circuit, a switching circuit and a control circuit. The converter circuit is configured to receive a direct current. The converter circuit includes a transformer, a primary side switch connected to a primary coil of the transformer and a secondary side switch connected to a secondary coil of the transformer. The switching circuit is electrically coupled to the converter circuit. The switching circuit includes a first capacitor, a first set of switches electrically coupled between the first capacitor and the secondary coil, a second capacitor and a second set of switches electrically coupled between the second capacitor and the secondary coil. The control circuit is electrically coupled to the converter circuit and the switching circuit. The control circuit controls the primary side switch and the secondary side switch. In a first phase of a switching cycle, the primary side switch is in conduction state and the secondary side switch is in off state, causing a magnetizing inductor of the transformer to store energy. In a second phase of the switching cycle, the primary side switch is in the off state and the secondary side switch is in the conduction state, causing the magnetizing inductor to release the energy. Operations of the switching circuit in the second phase of the switching cycle include a first mode and a second mode. The control circuit is configured to control the first set of switches and the second set of switches. In the first mode, the first set of switches are in the conduction state and the second set of switches are in the off state, causing a first amount of the energy to be transferred through the first set of switches to the first capacitor. In the second mode, the second set of switches are in the conduction state and the first set of switches are in the off state, causing a second amount of the energy to be transferred through the second set of switches to the second capacitor.

The present disclosure provides an operation method for power supply. The power supply includes a transformer, a primary side switch connected to a primary coil of the transformer, a secondary side switch connected to a secondary coil of the transformer, a first capacitor, a second capacitor, first set of switches electrically coupled between the first capacitor and the secondary coil, second set of switches electrically coupled between the second capacitor and the secondary coil and a control circuit electrically coupled to the primary side switch, the secondary side switch and the first and second sets of switches. The operation method includes the following steps. In a first phase of a switching cycle, the primary side switch is turned on, and the secondary side switch is turned off, causing a magnetizing inductor of the transformer to store energy. In a second phase of the switching cycle, the primary side switch is turned off, and the secondary side switch is turned on, causing the magnetizing inductor of the transformer to release energy. Operations in the second phase of the switching cycle include a first mode and a second mode. The operation method further includes the following steps. In the first mode, the first set of switches are turned on and the second set of switches are turned off, causing a first amount of the energy to be transferred through the first set of switches to the first capacitor. In the second mode, the second set of switches are turned on and the first set of switches are turned off, causing a second amount of the energy to be transferred through the second set of switches to the second capacitor.

The present disclosure provides a power supply. The power supply includes a converter circuit, a switching circuit and a control circuit. The converter circuit is configured to receive a direct current, comprising a transformer and a primary side switch connected to a primary coil of the transformer. The switching circuit is electrically coupled to the converter circuit. The switching circuit includes a first capacitor, a first set of switches electrically coupled between the first capacitor and a secondary coil of the transformer, a second capacitor and a second set of switches electrically coupled between the second capacitor and the secondary coil of the transformer. The control circuit is electrically coupled to the converter circuit and the switching circuit. The control circuit controls the primary side switch. In a first phase of a switching cycle, the primary side switch is in conduction state, causing a magnetizing inductor of the transformer to store energy. In a second phase of the switching cycle, the primary side switch is in the off state, causing the magnetizing inductor to release the energy. Operations of the switching circuit in the second phase of the switching cycle include a first mode and a second mode. The control circuit is configured to control the first set of switches and the second set of switches. In the first mode, the first set of switches are in the conduction state and the second set of switches are in the off state, causing a first amount of the energy to be transferred through the first set of switches to the first capacitor. In the second mode, the second set of switches are in the conduction state and the first set of switches are in the off state, causing a second amount of the energy to be transferred through the second set of switches to the second capacitor.

Summary, the power supply of the present disclosure is capable of charging two output capacitors in a switching cycle by controlling the first and second sets of switches. As such, when the load changes, the power supply of the present disclosure has the faster response speed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
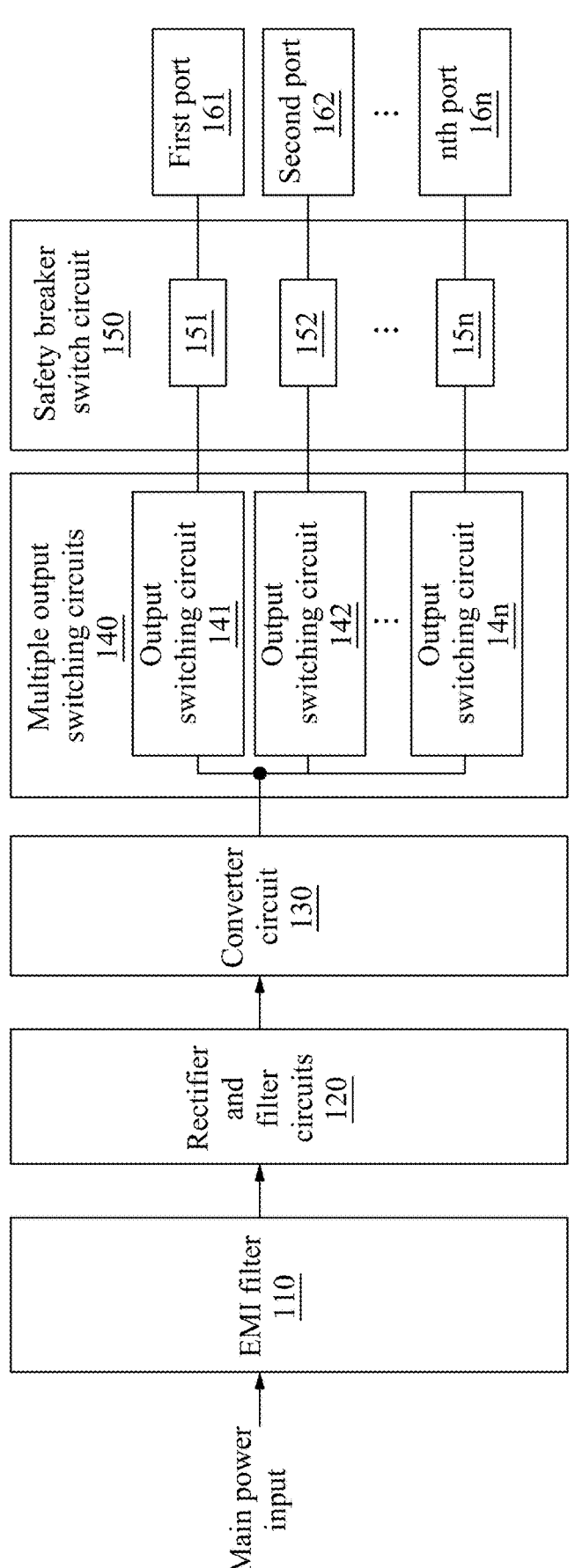
FIG. 1 depicts a schematic diagram of a power supply according to some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. Description of the operation does not intend to limit the operation sequence. Any structures resulting from recombination of elements with equivalent effects are within the scope of the present disclosure. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the description herein and throughout the claims that follow, unless otherwise defined, all terms have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the description herein and throughout the claims that follow, the terms "comprise" or "comprising," "include" or "including," "have" or "having," "contain" or "containing" and the like used herein are to be understood to be open-ended, i.e., to mean including but not limited to.

A description is provided with reference to FIG. 1. FIG. 1 depicts a schematic diagram of a power supply 100 according to some embodiments of the present disclosure. In some embodiments, the power supply 100 is a charging device with multiple output ports. As shown in FIG. 1, the power supply 100 includes an electromagnetic interference (EMI) filter 110, rectifier and filter circuits 120, a converter circuit 130, multiple output switching circuits 140, a safety breaker switch circuit 150, a first port 161 and second to nth ports 162~16n.

In some embodiments, the EMI filter 110 is configured to filter/suppress the electromagnetic interference transferred from the main power to a power cable of the power supply 100, and the EMI filter 110 transmits an alternating current to the rectifier and filter circuits 120. In some embodiments, the EMI filter 110 can be considered as a power line filter. In some embodiments, the EMI filter 110 can be configured or omitted, depending on design requirements, and it is not intended to limit the present disclosure.

In some embodiments, the rectifier and filter circuits 120 are electrically coupled to the EMI filter 110. The rectifier and filter circuits 120 are configured to rectify the alternating current to a direct current and filter the direct current to provide a stable voltage to the converter circuit 130.

In some embodiments, the converter circuit 130 is electrically coupled to the rectifier and filter circuits 120. The converter circuit 130 is a DC converter circuit, and the converter circuit 130 is configured to convert the DC voltage from the rectifier and filter circuits 120 to the other voltage level.

In some embodiments, the multiple output switching circuits 140 is electrically coupled to the converter circuit 130. The multiple output switching circuits 140 includes output switching circuits 141~14n, which are configured to respectively transmit parts of the energy output by the converter circuit 130 to the first port 161 to the nth port 16n. In some embodiments of the present disclosure, the multiple output switching circuits 140 refers to a switching circuit.

In some embodiments, switches 151~15n of the safety breaker switch circuit 150 are respectively electrically coupled between the multiple output switching circuits 140 and the first port 161 to the nth port 16n. In some embodiments, the safety breaker switch circuit 150 can be configured or omitted, depending on the regulation requirements and/or design requirements, and it is not intended to limit the present disclosure.

Figure 2:
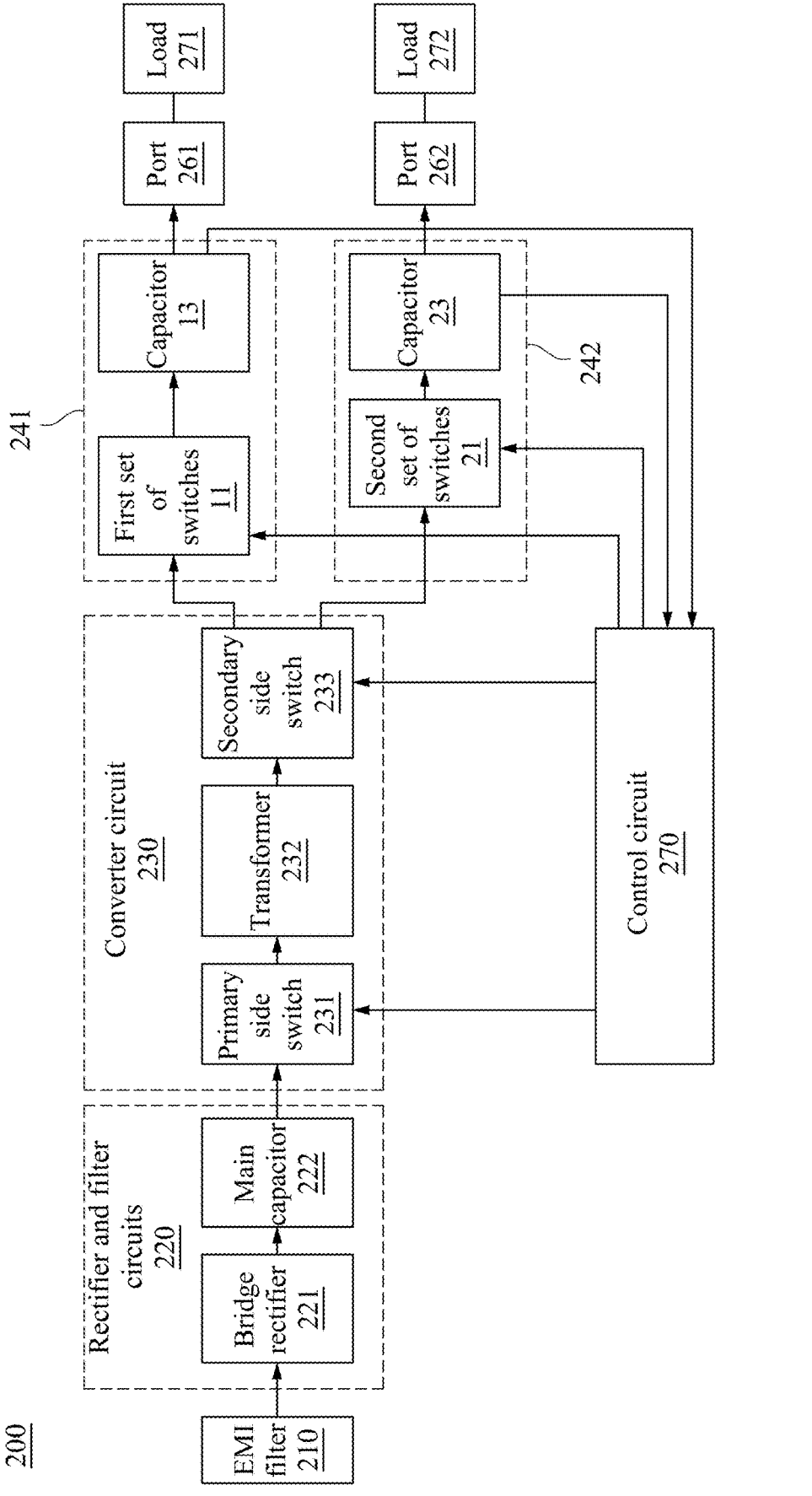
FIG. 2 depicts a schematic diagram of a power supply according to some embodiments of the present disclosure.

A description is provided with reference to FIG. 2. FIG. 2 depicts a schematic diagram of a power supply 200 according to some embodiments of the present disclosure. In some embodiments, the power supply 200 is a charging device with multiple output ports. For clarity, the number of the output ports of the power supply 200 is illustrated as two in this embodiment and the following embodiments, and it is not intended to limit the number of the output ports of the power supply in the present disclosure. As shown in FIG. 2, the power supply 200 includes an EMI filter 210, rectifier and filter circuits 220, a converter circuit 230, output switching circuits 241~242 and ports 261~262.

In some embodiments, the EMI filter 210, the rectifier and filter circuits 220 and the converter circuit 230 of the power supply 200 respectively correspond to the EMI filter 110, the rectifier and filter circuits 220 and the converter circuit 230 in FIG. 1. In some embodiments, the output switching circuits 241~242 of the power supply 200 corresponds to two of the output switching circuits 141~14n in FIG. 1, and the ports 261~262 of the power supply 200 corresponds to two of the first port 161 to the nth port 16n.

In some embodiments, the rectifier and filter circuits 220 include a bridge rectifier 221 and a main capacitor 222. In some embodiments, the bridge rectifier 221 is configured to rectify the alternating current to the direct current, and the main capacitor 222 is configured to filter the direct current output by the bridge rectifier 221 to provide the stable DC voltage.

In some embodiments, the converter circuit 230 includes a primary side switch 231, a transformer 232 and a secondary side switch 233. In some embodiments, the DC voltage can be converted to the AC voltage by controlling the primary side switch 231, and the energy can be transferred through the transformer 232 to the secondary side switch 233. The secondary side switch 233 can be controlled to form a conduction path in the secondary side, so as to perform synchronous rectification.

In some embodiments, the output switching circuit 241 includes first set of switches 11 and a capacitor 13. In some embodiments, the secondary side switch 233 and the first set of switches 11 are turned on to from a conduction path, thereby charging the capacitor 13. In some embodiments, the capacitor 13 is configured to store charges and filter a secondary side current, such that the port 261 provides the stable DC voltage to the load 271.

In some embodiments, the output switching circuit 242 includes second set of switches 21 and a capacitor 23. In some embodiments, the secondary side switch 233 and the second set of switches 21 are turned to from a conduction path, thereby charging the capacitor 23. In some embodiments, the capacitor 23 is configured to store charges and filter a secondary side current, such that the port 262 provides the stable DC voltage to the load 272.

In some embodiments, the control circuit 270 is electrically coupled to the converter circuit 230 and n sets of output switching circuits (such as, the output switching circuits 241~242). The control circuit 270 is electrically coupled to control terminals of the primary side switch 231 and the secondary side switch 233 included in the converter circuit 230 and control terminals of the n sets of switches included in the n sets of output switching circuits (such as, the first and second sets of switches 241~242), so as to control the operation (such as, the conduction or off states) of the aforesaid switches. In some embodiments, the control terminals of the switches are the gate terminals of the switches.

Figure 3:
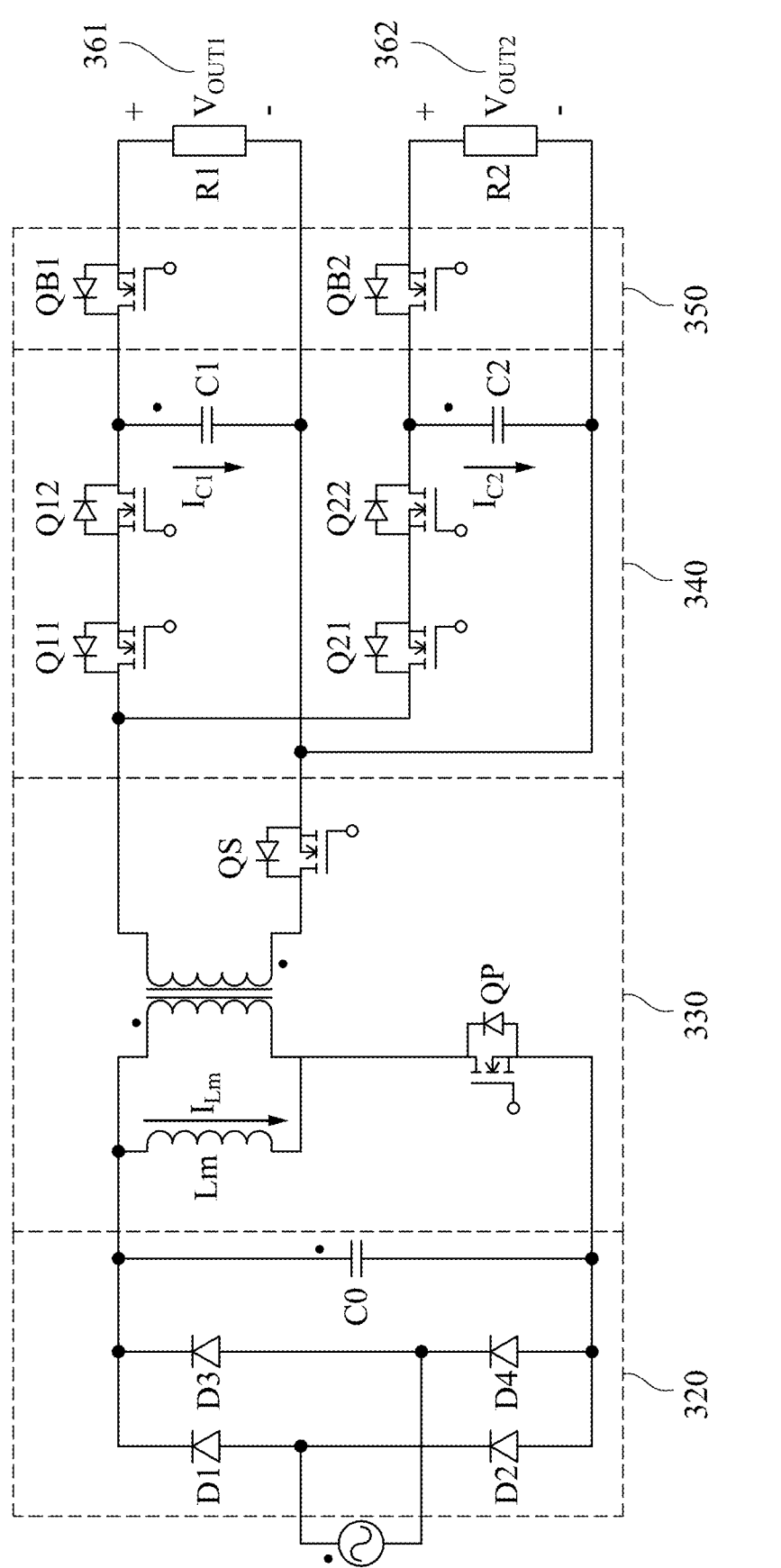
FIG. 3 depicts a schematic diagram of a power supply according to some embodiments of the present disclosure.

A description is provided with reference to FIG. 3. FIG. 3 depicts a schematic diagram of a power supply according to some embodiments of the present disclosure. In some embodiments, the power supply includes rectifier and filter circuits 320, a converter circuit 330, multiple output switching circuits 340 and a safety breaker switch circuit 350. In some embodiments, the rectifier and filter circuits 320, the converter circuit 330, the multiple output switching circuits 340 and the safety breaker switch circuit 350 of the power supply in FIG. 3 are respectively correspond to the rectifier and filter circuits 120, the converter circuit 130, the multiple output switching circuits 140 and the safety breaker switch circuit 150 of the power supply 100 in FIG. 1.

In some embodiments, the rectifier and filter circuits 320 includes a bridge rectifier and a capacitor C0. The bridge rectifier includes diodes D1~D4, which are configured to rectify the AC current and output the DC current. The capacitor C0 is configured to filter the DC current to provide the stable DC voltage.

In some embodiments, the converter circuit 330 includes a primary side switch QP, the secondary side switch QS and a transformer. In some embodiments, the transformer includes a primary coil and a secondary coil. In some embodiments, the magnetizing inductance of the transformer refers to magnetizing inductor Lm in the present disclosure, and the current flowing through the magnetizing inductor Lm can be considered as a magnetizing current ILM. In some embodiments, the primary side switch QP is electrically coupled to the primary coil.

In some embodiments, the secondary side switch QS is electrically coupled to the secondary coil. In some embodiments, the secondary side switch QS can be electrically coupled between a first terminal of the secondary coil and the multiple output switching circuits 340 (such as, between the first terminal of the secondary coil and a first terminal of the capacitor C1). In some embodiments, the secondary side switch QS is electrically coupled to the secondary coil. In the embodiments in FIG. 3, the secondary side switch QS can be electrically coupled between a second terminal of the secondary coil and the multiple output switching circuits 340 (such as, between the second terminal of the secondary coil and a second terminal of the capacitor C1). Therefore, it is not intended to limit the present disclosure.

In some embodiments, the multiple output switching circuits 340 includes two sets of output switching circuits. The first set of output switching circuit includes a first set of switches (such as, switches Q11 and Q12) and a capacitor C1. In some embodiments, the secondary side switch QS and the switches Q11 and Q12 are turned on to form a conduction path, thereby charging the capacitor C1. In some embodiments, the capacitor C1 is configured to store charges and filter the secondary side current, such that the port 361 provides the stable DC voltage $V_{OUT1}$ to the load R1.

The second set of the output switching circuit includes a second set of switches (such as, switches Q21 and switch Q21) and a capacitor C2. In some embodiments, the secondary side switch QS and the switches Q21 and Q22 are turned on to form a conduction path, thereby charging the capacitor C2. In some embodiments, the capacitor C2 is configured to store charges and filter the secondary side current, such that the port 362 provides the stable DC voltage $V_{OUT2}$ to the load R1.

In some embodiments, the safety breaker switch circuit 350 includes switches QB1 and QB2. In some embodiments, when the power supply provides single output, dual outputs or multiple outputs, the switches included in the safety breaker switch circuit 350, which correspond to these ports, are in the conduction state, and the remaining switches included in the safety breaker switch circuit 350 are in the off state.

Figure 4:
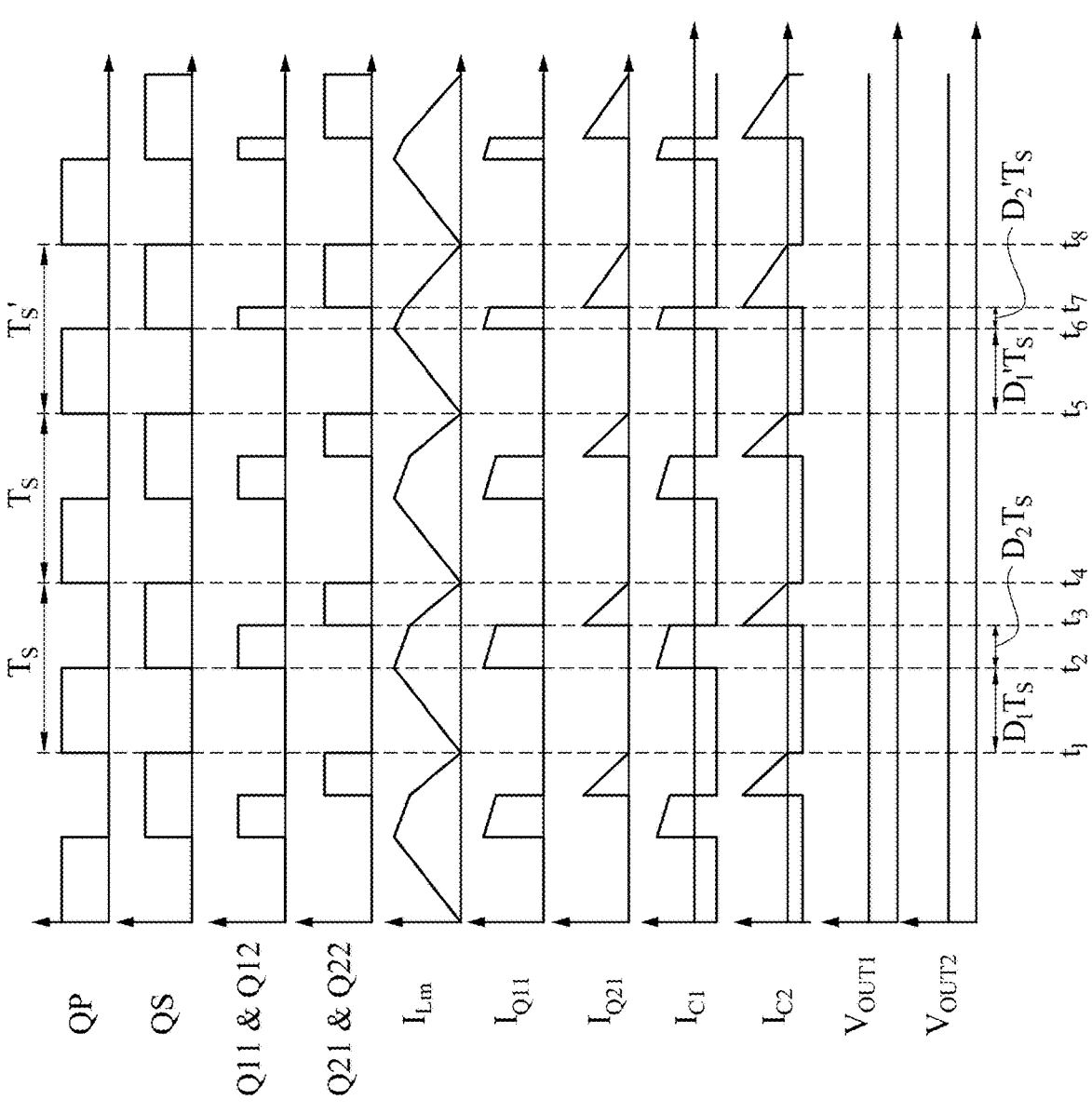
FIG. 4 depicts a timing diagram of signals of a power supply according to some embodiments of the present disclosure.

A description is provided with reference to FIG. 3 and FIG. 4. FIG. 4 depicts a timing diagram of signals of a power supply according to some embodiments of the present disclosure. In the embodiments of FIG. 4, when the secondary side switch QS is in the off state, and the primary side switch QP is in the conduction state, the converter circuit 330 operates in continuous current mode. As shown in FIG. 4, based on the operations of the converter circuit 330 (the primary side switch QP and the secondary side switch QS), the switching cycle Ts can be divided in to an energy storing phase of magnetizing inductor Lm (such as, $t_1{\sim}t_2$) and an energy releasing phase of magnetizing inductor Lm (such as, $t_2{\sim}t_4$). In the energy releasing phase of magnetizing inductor Lm, based on the number of all the output switching circuits (such as, n output switching circuits), the energy releasing phase of magnetizing inductor Lm can be further divided into n time periods. For clarity, the said number n is taken as 2. For illustration, a switching cycle Ts refers to a situation before increasing the load, and a switching cycle Ts' refers to a situation after increasing the load. In some embodiments, a time length of $t_1{\sim}t_2$ is $D_1{*}Ts$, and a time length of $t_2{\sim}t_3$ is $D_2{*}Ts$, where the said $D_1$ and $D_2$ can be adjustable duty cycles. Similarity, a time length of $t_5{\sim}t_6$ is $D_1'{*}Ts'$, and a time length of $t_6{\sim}t_7$ is $D_2'{*}Ts'$, where the said $D_1'$ and $D_2'$ can be adjustable duty cycles.

Figure 5A:
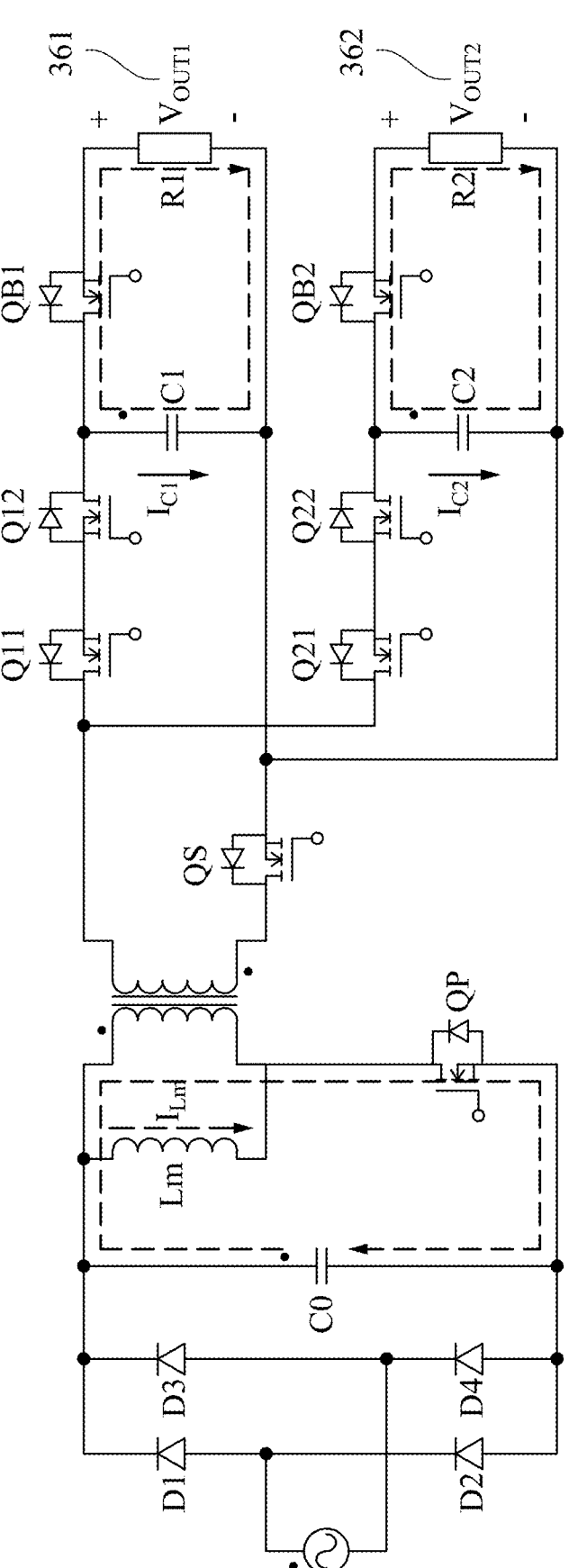
FIG. 5A depicts a schematic diagram of a power supply operating in a first phase of a switching cycle according to some embodiments of the present disclosure.
Figure 5B:
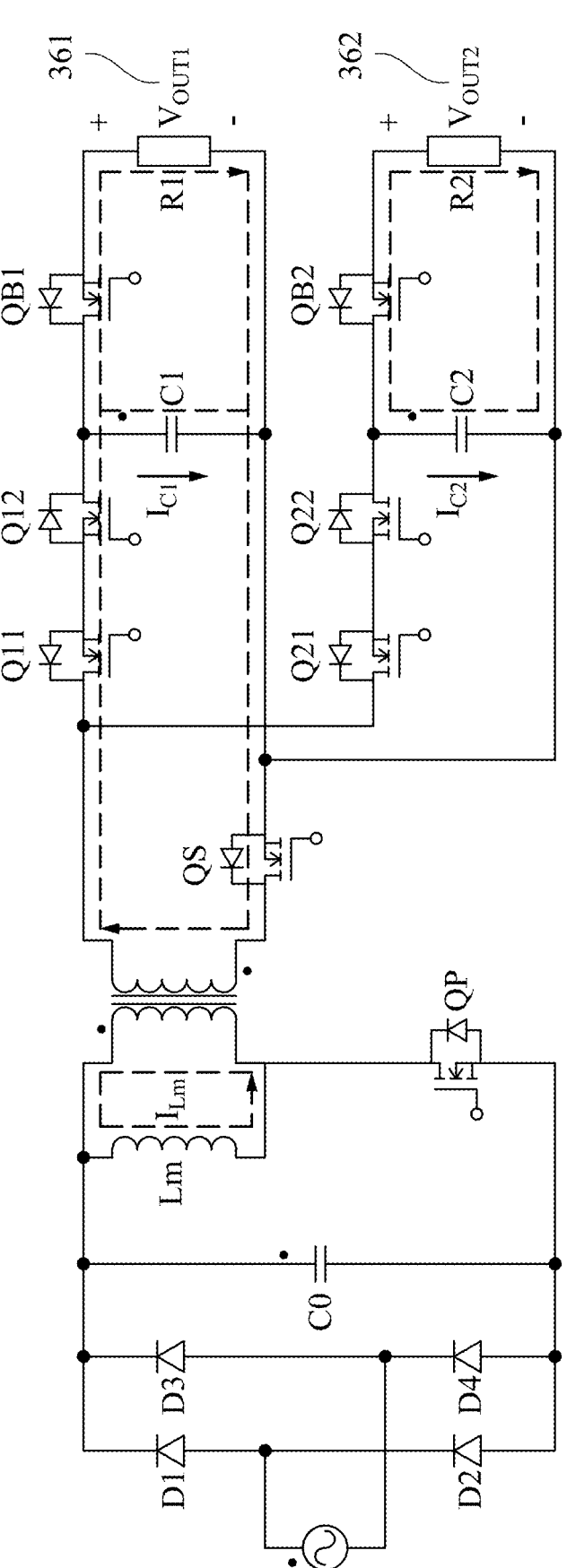
FIG. 5B depicts a schematic diagram of a power supply operating in a first mode included in a second phase of the switching cycle according to some embodiments of the present disclosure.
Figure 5C:
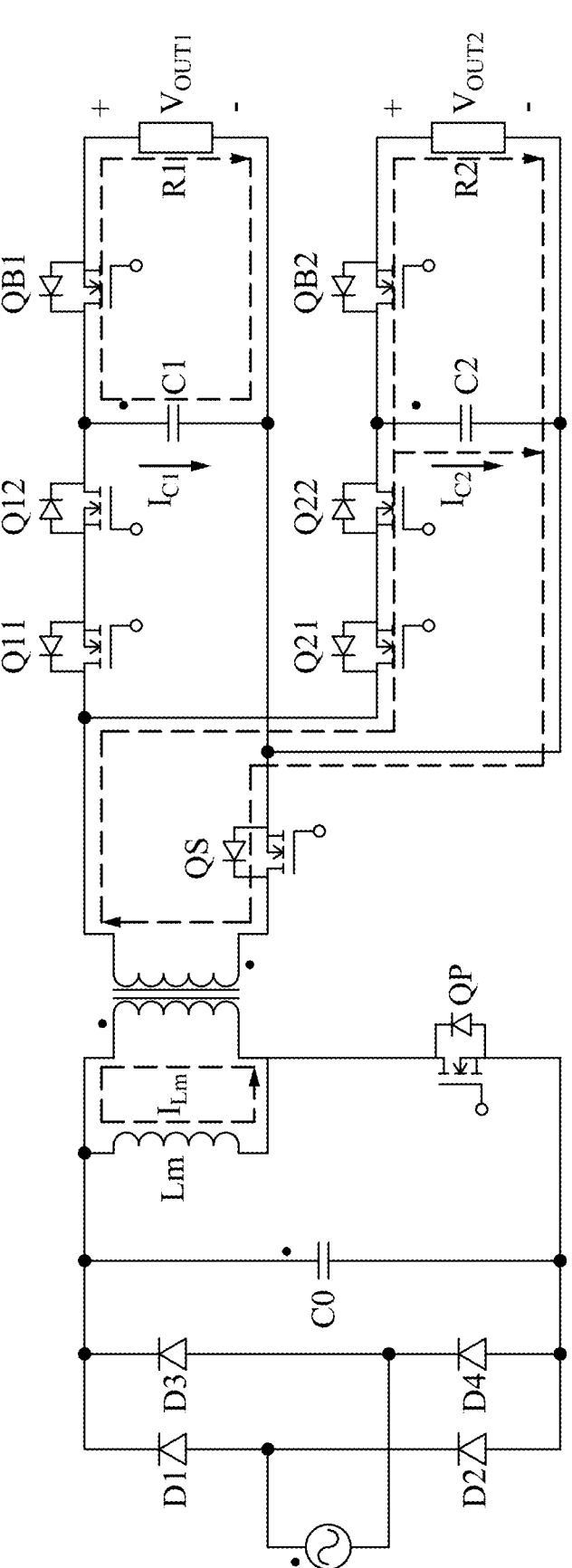
FIG. 5C depicts a schematic diagram of a power supply operating in a second mode included in the second phase of the switching cycle according to some embodiments of the present disclosure.

A description is provided with reference to FIG. 3, FIG. 4 and FIG. 5A to FIG. 5C. FIG. 5A depicts a schematic diagram of a power supply operating in a first phase of a switching cycle according to some embodiments of the present disclosure. FIG. 5B depicts a schematic diagram of a power supply operating in a first mode included in a second phase of the switching cycle according to some embodiments of the present disclosure. FIG. 5C depicts a schematic diagram of a power supply operating in a second mode included in the second phase of the switching cycle according to some embodiments of the present disclosure. To be noted that, an embodiment of FIG. 4 and FIG. 5A to FIG. 5C illustrates operations of a power supply with dual outputs.

As shown in FIG. 5A, in the period $t_1{\sim}t_2$, the primary side switch QP is in the conduction state, and the secondary side switch QS is in the off state. A primary side current flows from a first terminal of the capacitor C0 through magnetizing inductor Lm, the primary coil and the primary side switch QP to the second terminal of the capacitor C0, such that the magnetizing inductor Lm stores energy. In some embodiments, in the period $t_1{\sim}t_2$, the switches Q11~Q12 and Q21~Q22 are in off state. At this time, the capacitor C1 provides energy to the load R1, and the capacitor C2 provides energy to the load R2.

As shown in FIG. 5B, in the period $t_2{\sim}t_3$, the primary side switch QP is in the off state, and the secondary side switch QS is in the conduction state. The magnetizing inductor Lm releases the energy, and the magnetizing current ILM flows though the primary coil. In the period $t_2{\sim}t_3$, the switches Q21 and Q22 are in the off state, and the capacitor C2 provides energy to the load R2. In the period $t_2{\sim}t_3$, the secondary side switch QS and the switches Q11~Q12 are in the conduction state, the switches Q11~Q12, the capacitor C1 and the secondary side switch QS form a conduction path. The current induced in secondary coil flows from the first terminal of the secondary coil through the switches Q11~Q12, the capacitor C1 and the secondary side switch QS to the second terminal of the secondary coil, thereby charging the capacitor C1 and providing energy to the load R1. That is, a part of the energy stored by the magnetizing inductor Lm in the period $t_1{\sim}t_2$ is transferred through the switches Q11~Q12 to the capacitor C1 and the load R1.

As shown in FIG. 5C, in the period $t_3{\sim}t_4$, the primary side switch QP is in the off state, and the secondary side switch QS is in the conduction state. The magnetizing inductor Lm releases the energy, and the magnetizing current ILM flows through the primary coil. In the period $t_3{\sim}t_4$, the switch Q11 and Q12 are in the off state, and the capacitor C1 provides energy to the load R1. In the period $t_3{\sim}t_4$, the secondary side switch QS and the switches Q21~Q22 are turned on, the switches Q21~Q22, the capacitor C2 and the secondary side switch QS form a conduction path. The current induced in the secondary coil flows from the first terminal of the secondary coil through the switches Q21~Q22, the capacitor C2 and the secondary side switch QS to the second terminal of the secondary coil, thereby charging the capacitor C2 and providing energy to the load R2. That is, the other part of the energy stored by the magnetizing inductor Lm is transferred through the switches Q21~Q22 to the capacitor C2 and the load R2.

To be noted that, if the power supply has n output ports, and the output ports provide n outputs, the period $t_2{\sim}t_4$ can be divided into n subphases. The magnetizing inductor Lm stores energy in the period $t_2{\sim}t_4$, and the magnetizing inductor Lm releases the energy to the capacitors of the n output switching circuits, respectively. The time length of each of the n subphases is adjustable.

Figure 6:
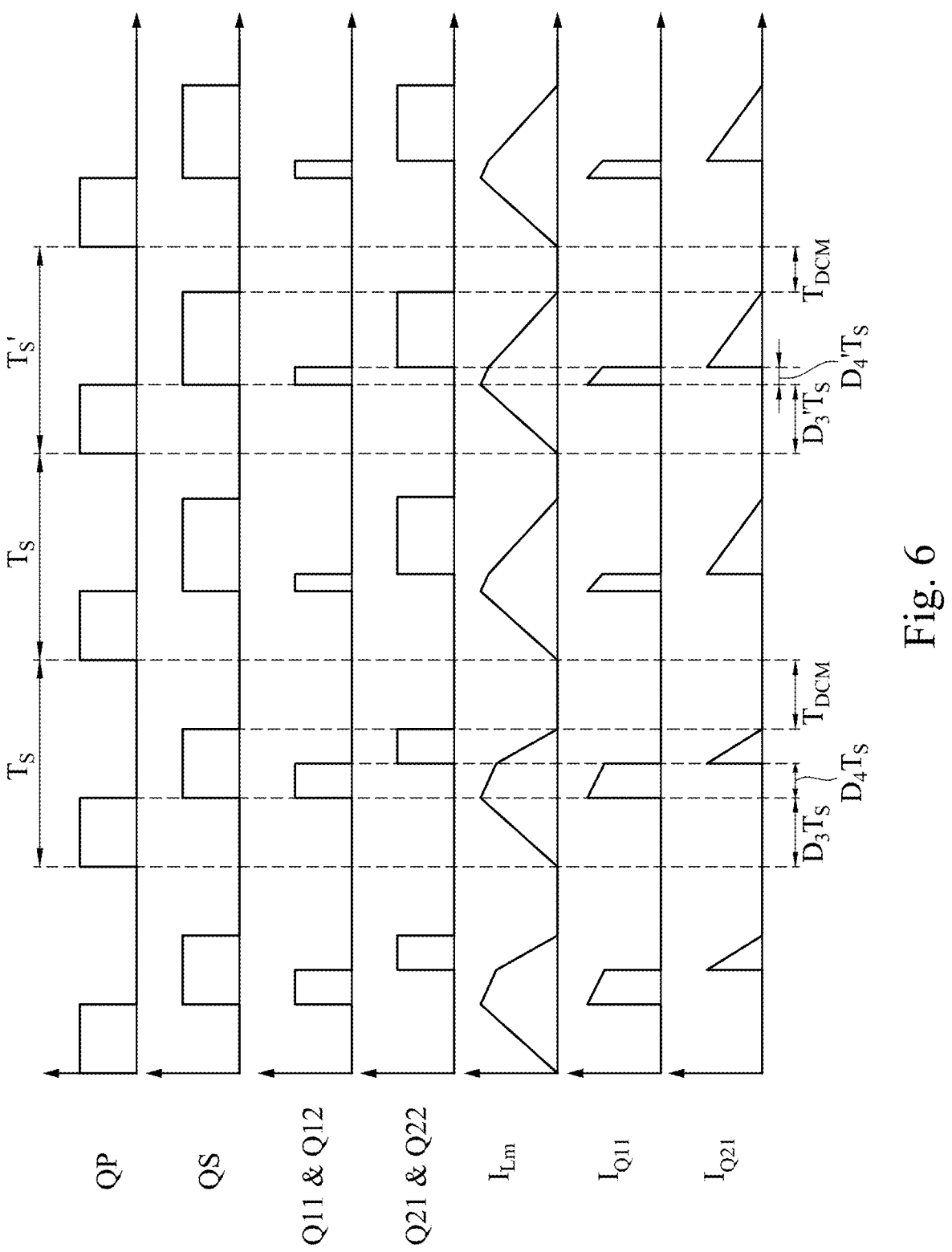
FIG. 6 depicts a timing diagram of signals of a power supply according to some embodiments of the present disclosure.

A description is provided with reference to FIG. 3 and FIG. 6. FIG. 6 depicts a timing diagram of signals of a power supply according to some embodiments of the present disclosure. In the embodiment of FIG. 6, the switching cycle TS includes an idle phase when both of the primary side switch QP and the secondary side switch QS are in the off state, the converter circuit 330 operates in discontinuous current mode. As shown in FIG. 5, based on the operations of the converter circuit 330 (the primary side switch QP and the secondary side switch QS), the switching cycle Ts can be divided into an energy storing phase of the magnetizing inductor Lm, an energy releasing phase of the magnetizing inductor Lm and an idle phase. In the energy releasing phase of the magnetizing inductor Lm, based on the number of all the output switching circuits (such as, n output switching circuits), the energy releasing phase of magnetizing inductor Lm can be further divided into n time periods. For clarity, the said number n is taken as 2. For illustration, a switching cycle Ts refers to a situation before increasing the load, and a switching cycle Ts' refers to a situation after increasing the load. In some embodiments, a time length of the energy storing phase is $D_3{*}Ts$, and a time length of a first sub phase in the energy releasing phase is $D_4{*}Ts$, where the said $D_3$ and $D_4$ are adjustable duty cycles. Similarity, in the switching cycle Ts', a time length of the energy storing phase is $D_3'{*}Ts'$, and a time length of a first sub phase in the energy releasing phase is $D_4'{*}Ts'$, where the said $D_3'$ and $D_4'$ can be adjustable duty cycles. The time length of the idle phase is $T_{DCM}$. In some embodiments, the operations of the power supply in the energy storing phase and the energy releasing phase in the discontinuous current mode are similar with the operations of the power supply in the energy storing phase and the energy releasing phase in the continuous current mode, and the description is omitted here.

Figure 7B:
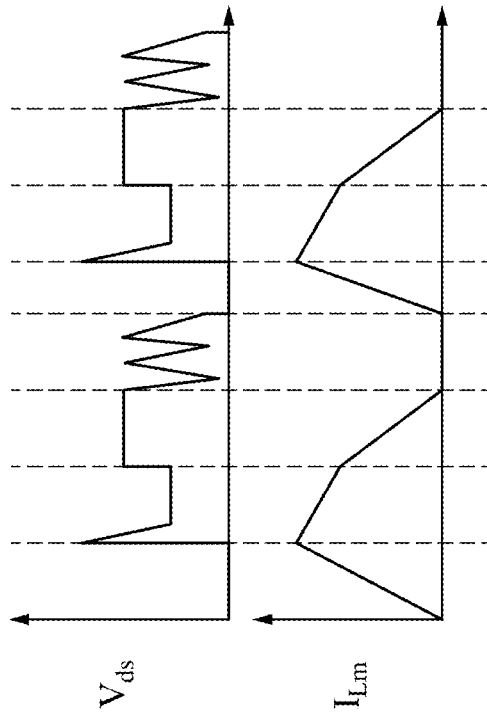
FIG. 7B depicts a schematic diagram of supplying power to the low voltage port and then supplying power to the high voltage port according to some embodiments of the present disclosure.
Figure 7A:
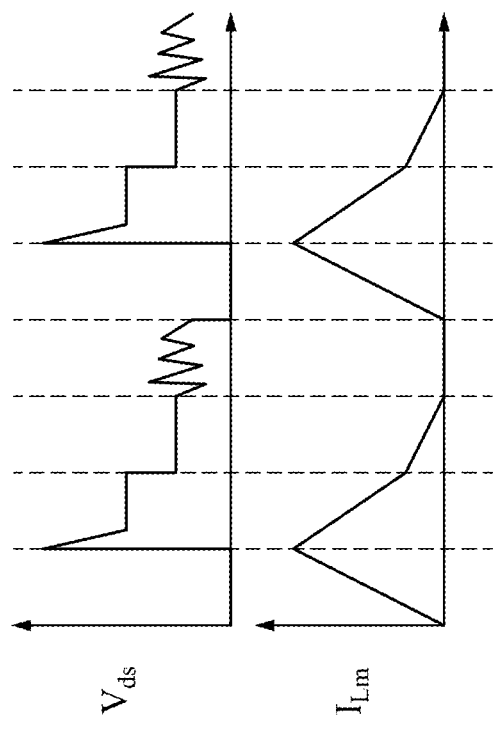
FIG. 7A depicts a schematic diagram of supplying power to the high voltage port and then supplying power to the low voltage port according to some embodiments of the present disclosure.

A description is provided with reference to FIG. 3 and FIG. 7A to FIG. 7B. FIG. 7A depicts a schematic diagram of supplying power to the high voltage port and then supplying power to the low voltage port according to some embodiments of the present disclosure. FIG. 7B depicts a schematic diagram of supplying power to the low voltage port and then supplying power to the high voltage port according to some embodiments of the present disclosure.

As shown in FIG. 7A, when the magnetizing inductor releases energy, if the energy is first provided to the high voltage port and then provided to the low voltage port, an oscillation of voltage across the source and drain of the primary side switch is smaller, it is more difficult to oscillate to 0.

As shown in FIG. 7B, when the magnetizing inductor releases energy, if the energy is first provided to the low voltage port and then provided to the high voltage port, an oscillation of voltage across the source and drain of the primary side switch is greater, it is more easily to oscillate to 0.

Therefore, under a condition that the voltage of the output ports are different to each other, an execution sequence of the operation modes of the switching circuit depends on the order of the voltage levels of the output ports. That is, when the magnetizing inductor releases the energy, the energy is last provided to the highest voltage port before the end of releasing the energy of the magnetizing inductor. For example, if the output voltage $V_{OUT1}$ of the port 361 is less than the output voltage $V_{OUT2}$ of the port 362, the switches Q11~Q12 are turned on and the switches Q21~Q22 are turned off first and then the switches Q11~Q12 are turned off and the switches Q21~Q22 are turned on, when the magnetizing inductor releases the energy. On the other hand, if the output voltage $V_{OUT1}$ of the port 361 is higher than the output voltage $V_{OUT2}$ of the port 362, the switches Q11~Q12 are turned off and the switches Q21~Q22 are turned on first and then the switches Q11~Q12 are turned on and the switches Q21~Q22 are turned off, when the magnetizing inductor releases the energy.

To be noted that, under a condition that the voltage of the output ports are the same as each other, an execution sequence of the operation modes of the switching circuit depends on the order of the loads of the output ports. That is, when the magnetizing inductor releases the energy, the energy is first provided to an output port under the greatest load. For example, if the load R1 of the port 361 is greater than the load R2 of the port 362, the switches Q11~Q12 are turned on and the switches Q21~Q22 are turned off first and then the switches Q11~Q12 are turned off and the switches Q21~Q22 are turned on, when the magnetizing inductor releases the energy. On the other hand, if the load R1 of the port 361 is less than the load R2 of the port 362, the switches Q11~Q12 are turned off and the switches Q21~Q22 are turned on first and then the switches Q11~Q12 are turned on and the switches Q21~Q22 are turned off, when the magnetizing inductor releases the energy.

Figure 8:
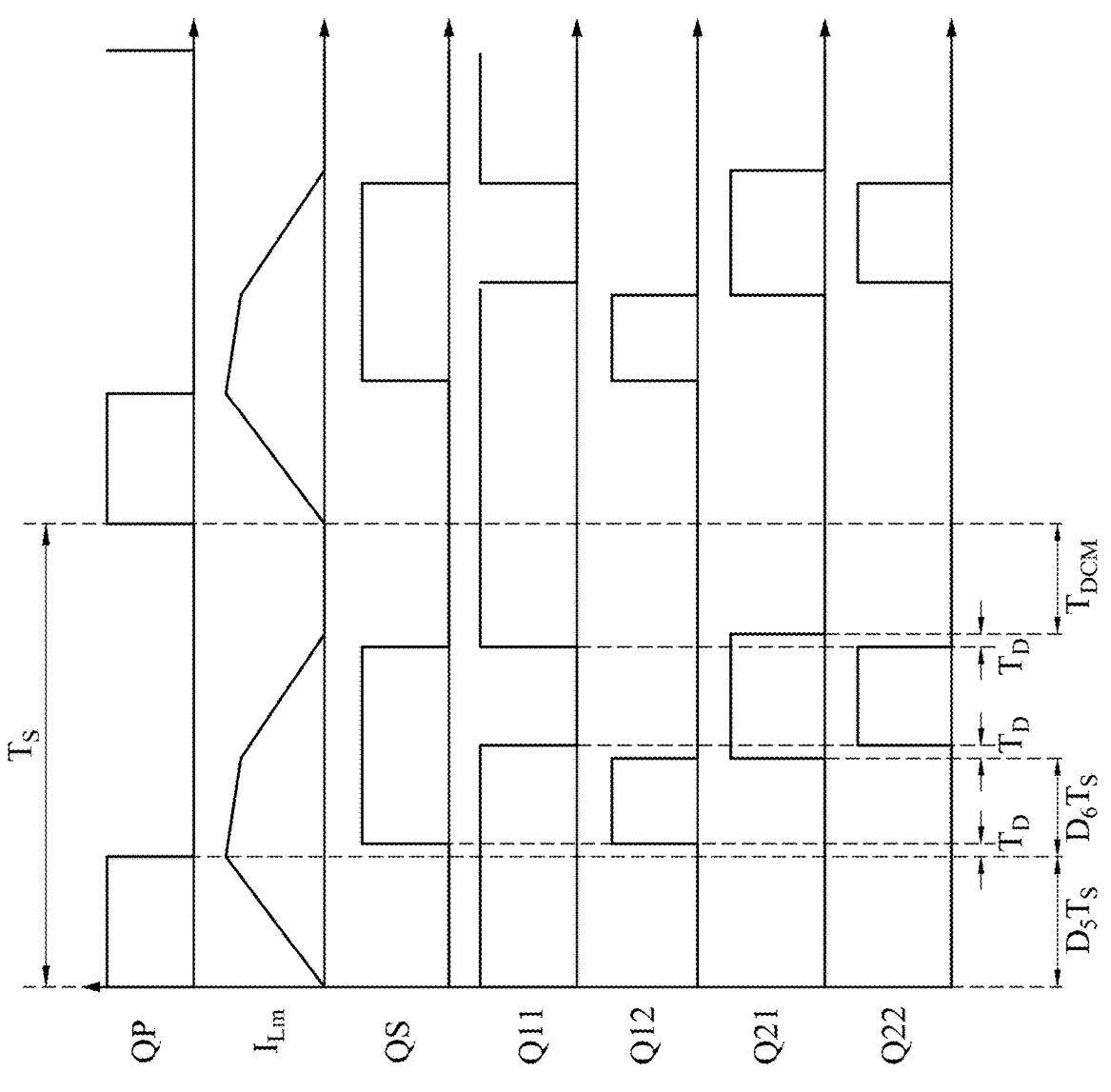
FIG. 8 depicts a timing diagram of signals of a power supply according to some embodiments of the present disclosure.

A description is provided with reference to FIG. 3 and FIG. 8. FIG. 8 depicts a timing diagram of signals of a power supply according to some embodiments of the present disclosure. In the embodiment of FIG. 8, the power supply can implement soft switching, thereby reducing losses.

As shown in FIG. 8, the first set of switches (such as, the switches Q11 and Q12) and the second set of switches (such as, the switches Q21 and Q22) included in the multiple output switching circuits 340 operate in the continuous current mode. For example, in the switching cycle Ts, when the switches Q21 and Q22 are in the off state, the switch Q11 is in the conduction state. As a result, there is a freewheeling path among in the secondary side of the converter circuit 330 and the multiple output switching circuits 340, thereby reducing the switching losses. In some embodiments, the turn-off of the switch Q11 is delayed, and the turn-on of the switch Q22 is delayed, in order to implement zero voltage switching. In some embodiments, the turn-off delay time for the switch Q11 or the turn-on delay time for the switch Q21 is given by TD. In some embodiments, a time length of the energy storing phase is $D_5$*Ts, and a time length of a first sub phase in the energy releasing phase is $D_6$*Ts, where the said $D_5$ and $D_6$ are adjustable duty cycles. In some embodiments, in first sub phase of the switching cycle, the switch Q11 is in the conduction state, and the switches Q12 and Q21~Q22 are in the off state. In some embodiments, there is a delay time between turn-off of the primary side switch QP and turn-on of the switch Q12. In some embodiments, there is a delay time between turn-on of the switch Q21 and turn-on of the switch Q22.

Figure 9B:
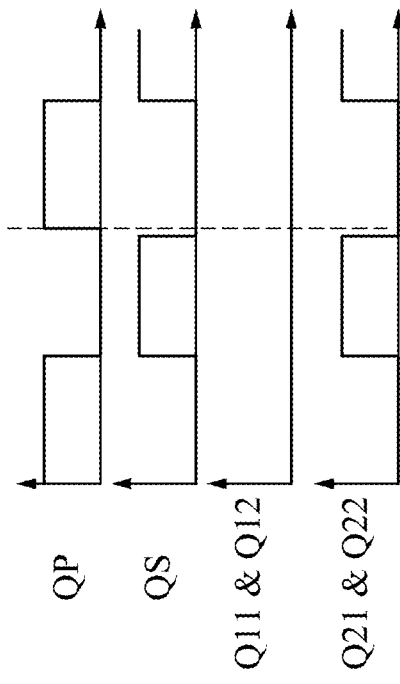
FIGS. 9A and 9B depicts a timing diagram of signals of a power supply according to some embodiments of the present disclosure.
Figure 9A:
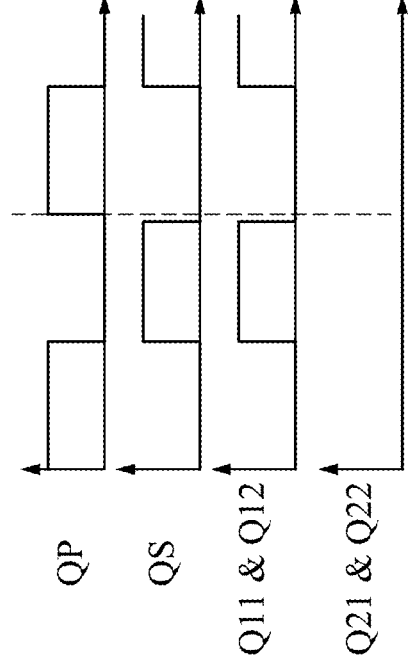

A description is provided with reference to FIG. 3, FIG. 9A and FIG. 9B. FIGS. 9A and 9B depicts a timing diagram of signals of a power supply according to some embodiments of the present disclosure. The embodiments of FIGS. 9A and 9B are the power supply operates in single output mode. As shown in FIG. 9A, in the single output mode, if the port 361 of the power supply provides the output voltage $V_{OUT1}$, the switches Q11 and Q12 are turned on in energy releasing phases of the magnetizing inductor, and the switches Q21 and Q22 are turned off in the in energy releasing phases of the magnetizing inductor. As shown in FIG. 9B, in the single output mode, if the port 362 of the power supply provides the output voltage $V_{OUT2}$, the switches Q21 and Q22 are turned on in energy releasing phases of the magnetizing inductor, and the switches Q11 and Q12 are turned off in the in energy releasing phases of the magnetizing inductor.

Figure 10:
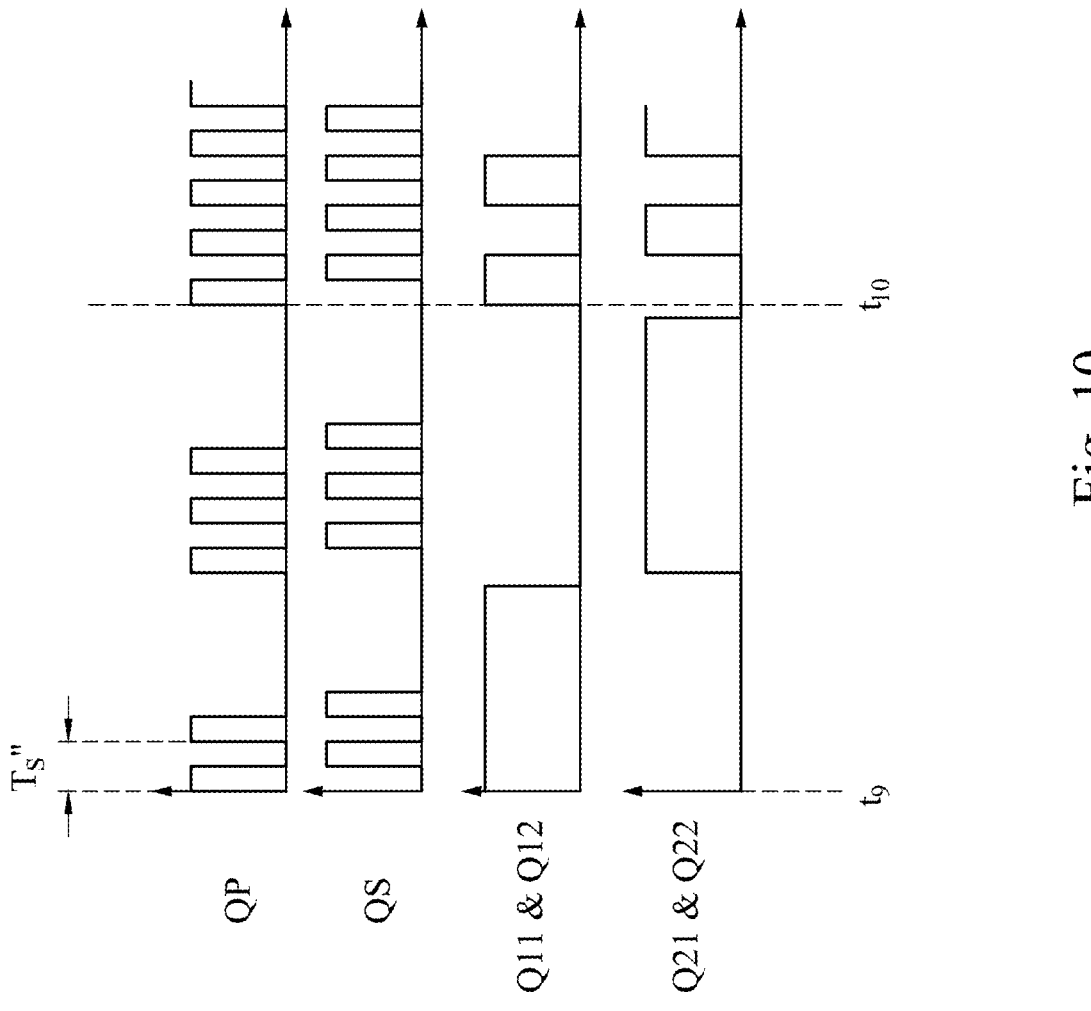
FIG. 10 depicts a timing diagram of signals of a power supply according to some embodiments of the present disclosure.

A description is provided with reference to FIG. 3, FIG. 10. FIG. 10 depicts a timing diagram of signals of a power supply according to some embodiments of the present disclosure. The embodiment of FIG. 10 is the power supply operates in a very light load mode and a light load mode.

In period $t_9$~$t_{10}$, the power supply operates in the very light load mode, a conduction time of the switches Q11 and Q12 corresponds to multiple switching cycles Ts of the converter circuit 330, and a conduction time of the switches Q21 and Q22 corresponds to multiple switching cycles Ts" of the converter circuit 330.

After the time to, the power supply operates in the light load mode, the a conduction time of the switches Q11 and Q12 corresponds to one switching cycle Ts of the converter circuit 330, and a conduction time of the switches Q21 and Q22 corresponds to one switching cycle Ts" of the converter circuit 330.

Figure 11:
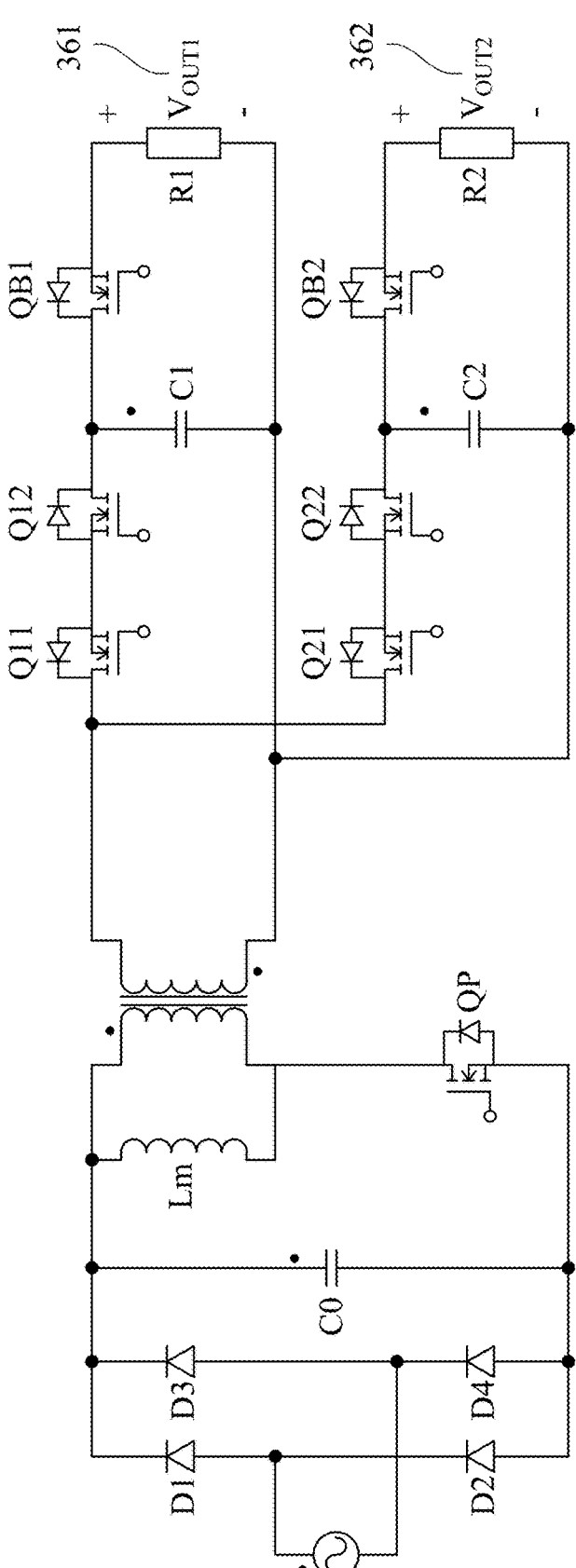
FIG. 11 depicts a schematic diagram of a power supply according to some embodiments of the present disclosure.

A description is provided with reference to FIG. 11. FIG. 11 depicts a schematic diagram of a power supply 1100 according to some embodiments of the present disclosure. Compare the power supply in FIG. 3, the secondary side switch is omitted in the power supply 1100 in FIG. 11, and the functions of the secondary side switch is replaced by the switches Q12 and Q22. In this case, the switch has the greater voltage stress, and thus the operation of the power supply 1100 can be implemented by the control method of the embodiments in FIG. 8 to achieve the soft switching, thereby reducing losses.

A description is provided with reference to FIG. 12 to FIG. 15. FIGS. 12 to 15 depict schematic diagrams of control circuits 1200~1500 according to some embodiments of the present disclosure. In some embodiments, the control circuit 270 in FIG. 2 can be implemented by any one of the control circuits 1200~1500 in FIG. 12 to FIG. 15.

Figure 12:
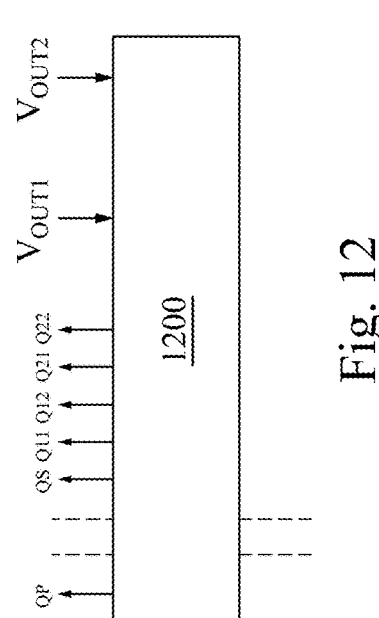

As shown in FIG. 12, the control circuit 1200 is a pulse width modulation chip with isolation functions and power delivery protocol. The control circuit 1200 is configured to receive the output voltages $V_{OUT1}$ and $V_{OUT2}$, in order to generate and provide control signals to the switches (such as, the primary side switch QP, the secondary side switch QS and the switches Q11~Q12 and Q21~Q22) according to the output voltages $V_{OUT1}$ and $V_{OUT2}$.

Figure 13:
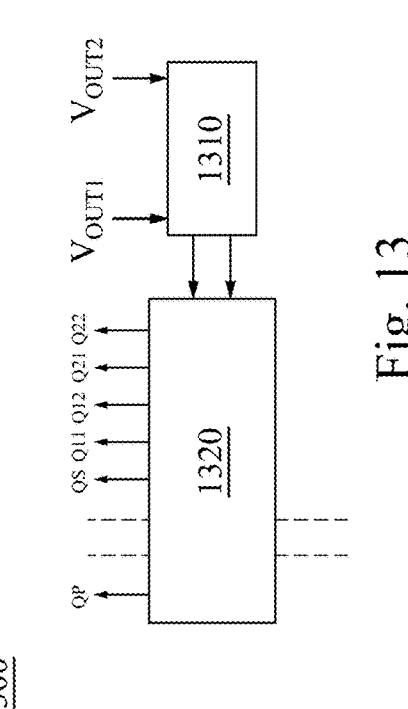
FIGS. 12 to 15 depict schematic diagrams of control circuits according to some embodiments of the present disclosure.

As shown in FIG. 13, the control circuit 1300 includes one or more power delivery chips 1310 and a pulse width modulation chip with isolation functions 1320. The power delivery chip 1310 is configured to receive the output voltage $V_{OUT1}$ and $V_{OUT2}$, in order to generate outputs according to the output voltage $V_{OUT1}$ and $V_{OUT2}$, and provide the outputs to the pulse width modulation chip with isolation functions 1320. The pulse width modulation chip with isolation functions 1320 generates and provides control signals to the switches (such as, the primary side switch QP, the secondary side switch QS and the switches Q11~Q12 and Q21~Q22) according to the outputs of power delivery chip 1310.

Figure 14:
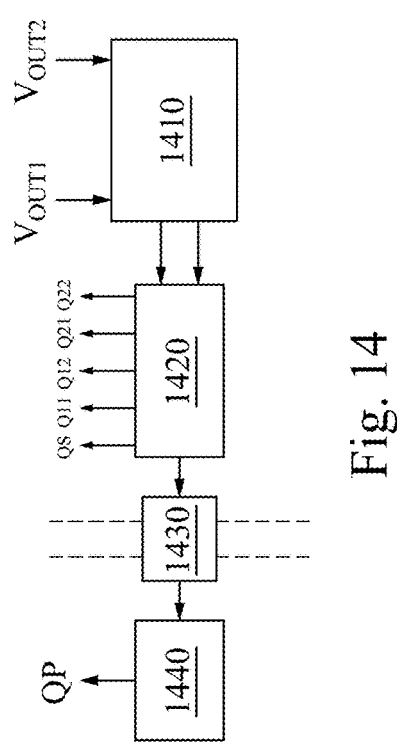

As shown In FIG. 14, the control circuit 1400 includes one or more power delivery control chip 1410, a pulse width modulation chip 1420, an optocoupler 1430 and a pulse width modulation chip 1440. The power delivery control chip 1410 is configured to receive the output voltage $V_{OUT1}$ and $V_{OUT2}$, in order to generate outputs according to the output voltage $V_{OUT1}$ and $V_{OUT2}$, and provide the outputs to the pulse width modulation chip 1420. The pulse width modulation chip 1420 generates control signals for the secondary side switch QS and the switches Q11~Q12 and Q21~Q22 according to the outputs of the power delivery control chip 1410. The pulse width modulation chip 1420 communicates with the pulse width modulation chip 1440 through the optocoupler 1430, such that the pulse width modulation chip 1440 generates a control signal for the primary side switch QP.

Figure 15:
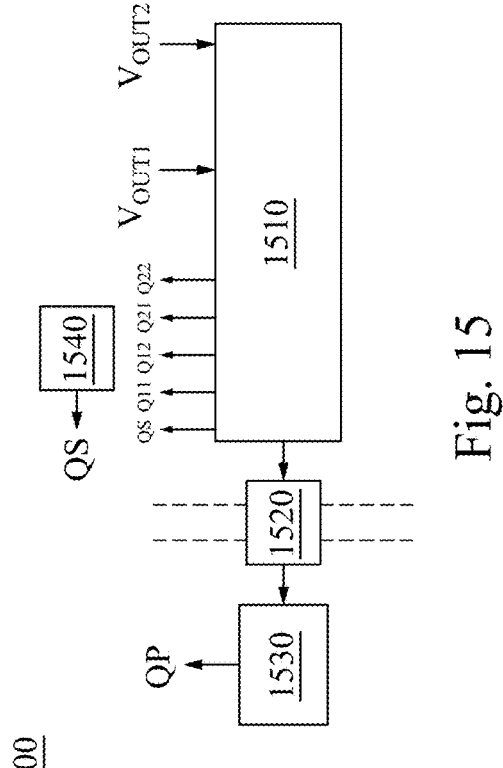

As shown In FIG. 15, the control circuit 1500 includes a pulse width modulation chip with power delivery control 1510, an optocoupler 1520, a pulse width modulation chip 1530 and a synchronous rectification chip 1540. The pulse width modulation chip with power delivery control 1510 is configured to receive the output voltage $V_{OUT1}$ and $V_{OUT2}$, in order to generate control signals for switches Q11~Q12 and switch Q21~Q22 according to the output voltages $V_{OUT1}$ and $V_{OUT2}$. The pulse width modulation chip with power delivery control 1510 communicates with the pulse width modulation chip 1530 through the optocoupler 1520, such that the pulse width modulation chip 1440 generates a control signal for the primary side switch QP. The synchronous rectification chip 1540 is configured to generate a control signal for the secondary side switch QS.

Summary, the power supply of the present disclosure is capable of charging two output capacitors in a switching cycle by controlling the first and second sets of switches. As such, when the load changes, the power supply of the present disclosure has the faster response speed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A power supply, comprising:
a converter circuit, configured to receive a direct current, comprising a transformer, a primary side switch connected to a primary coil of the transformer and a secondary side switch connected to a secondary coil of the transformer;
a switching circuit, electrically coupled to the converter circuit, comprising a first capacitor, a first set of switches electrically coupled between the first capacitor and the secondary coil, a second capacitor and a second set of switches electrically coupled between the second capacitor and the secondary coil; and
a control circuit, electrically coupled to the converter circuit and the switching circuit, and wherein the control circuit controls the primary side switch and the secondary side switch, such that:
in a first phase of a switching cycle, the primary side switch is in conduction state and the secondary side switch is in off state, causing a magnetizing inductor of the transformer to store energy;
in a second phase of the switching cycle, the primary side switch is in the off state and the secondary side switch is in the conduction state, causing the magnetizing inductor to release the energy, wherein operations of the switching circuit in the second phase of the switching cycle comprise a first mode and a second mode, and wherein the control circuit is configured to control the first set of switches and the second set of switches, such that:
in the first mode, the first set of switches are in the conduction state and the second set of switches are in the off state, causing a first amount of the energy to be transferred through the first set of switches to the first capacitor; and
in the second mode, the second set of switches are in the conduction state and the first set of switches are in the off state, causing a second amount of the energy to be transferred through the second set of switches to the second capacitor.

2. The power supply of claim 1, wherein:
if the converter circuit operates in a discontinuous current mode, the switching cycle comprises the first phase, the second phase and an idle phase, and wherein in the idle phase, the control circuit is further configured to turn off the primary side switch, the secondary side switch, the first set of switches and the second set of switches; and
if the converter circuit operates in a continuous current mode, the switching cycle consists of the first phase and the second phase.

3. The power supply of claim 1, wherein the first capacitor is electrically coupled to a first port to supply an output voltage, and wherein the second capacitor is electrically coupled to a second port to supply an output voltage.

4. The power supply of claim 3, wherein if the output voltage of the first port is different from the output voltage of the second port, an execution sequence of the first mode and the second mode depends on a ratio of the output voltage of the first port to the output voltage of the second port.

5. The power supply of claim 4, wherein:
if the output voltage of the first port is less than the output voltage of the second port, the first mode is executed before the second mode; and
if the output voltage of the first port is greater than the output voltage of the second port, the first mode is executed after the second mode.

6. The power supply of claim 3, wherein if the output voltage of the first port corresponds to the output voltage of the second port, an execution sequence of the first mode and the second mode depends on a ratio of a load of the first port to a load of the second port.

7. The power supply of claim 6, wherein:
if the output voltage of the first port corresponds to the output voltage of the second port, and the load of the first port is greater than the load of the second port, the first mode is executed before the second mode; and
if the output voltage of the first port corresponds to the output voltage of the second port, and the load of the first port is less than the load of the second port, the first mode is executed after the second mode.

8. The power supply of claim 1, wherein the first set of switches comprises a first switch and a second switch electrically connected in series between the secondary coil and the first capacitor, wherein the second set of switches comprises a third switch and a fourth switch electrically connected in series between the secondary coil and the second capacitor, and wherein when the third switch is in the off state, the first switch is in the conduction state, such that the first switch and the third switch operates in a continuous current mode, thereby implementing soft switching.

9. An operation method for power supply, wherein the power supply comprises a transformer, a primary side switch connected to a primary coil of the transformer, a secondary side switch connected to a secondary coil of the transformer, a first capacitor, a second capacitor, a first set of switches electrically coupled between the first capacitor and the secondary coil, a second set of switches electrically coupled between the second capacitor and the secondary coil and a control circuit electrically coupled to the primary side switch, the secondary side switch and the first and second sets of switches, and wherein the operation method comprises:
in a first phase of a switching cycle, turning on the primary side switch, and turning off the secondary side switch, causing a magnetizing inductor of the transformer to store energy; and
in a second phase of the switching cycle, turning off the primary side switch, and turning on the secondary side switch, causing the magnetizing inductor of the transformer to release the energy, wherein operation in the second phase of the switching cycle comprise a first mode and a second mode, and wherein the operation method further comprises:
in the first mode, turning on the first set of switches and turning off the second set of switches, causing a first amount of the energy to be transferred through the first set of switches to the first capacitor; and
in the second mode, turning on the second set of switches and turning off the first set of switches, causing a second amount of the energy to be transferred through the second set of switches to the second capacitor.

10. A power supply, comprising:
a converter circuit, configured to receive a direct current, comprising a transformer and a primary side switch connected to a primary coil of the transformer;
a switching circuit, electrically coupled to the converter circuit, comprising a first capacitor, a first set of switches electrically coupled between the first capacitor and a secondary coil of the transformer, a second capacitor and a second set of switches electrically coupled between the second capacitor and the secondary coil of the transformer; and
a control circuit, electrically coupled to the converter circuit and the switching circuit, and wherein the control circuit controls the primary side switch, such that:
in a first phase of a switching cycle, the primary side switch is in conduction state, causing a magnetizing inductor of the transformer to store energy;
in a second phase of the switching cycle, the primary side switch is in the off state, causing the magnetizing inductor to release the energy, wherein operations of the switching circuit in the second phase of the switching cycle comprise a first mode and a second mode, and wherein the control circuit is configured to control the first set of switches and the second set of switches, such that:
in the first mode, the first set of switches are in the conduction state and the second set of switches are in the off state, causing a first amount of the energy to be transferred through the first set of switches to the first capacitor; and
in the second mode, the second set of switches are in the conduction state and the first set of switches are in the off state, causing a second amount of the energy to be transferred through the second set of switches to the second capacitor.

11. The power supply of claim 10, wherein the first set of switches comprises first to second switches connected in series between the secondary coil and the first capacitor, and wherein the second set of switches comprises third to fourth switches connected in series between the secondary coil and the second capacitor.

12. The power supply of claim 11, wherein the control circuit is further configured to control the first set of switches and the second set of switches, such that:
in the first phase of the switching cycle, the first switch is in the conduction state, and the second to fourth switches are in the off state.

13. The power supply of claim 11, wherein there is a delay time between turn-off of the primary side switch and turn-on of the second switch.

14. The power supply of claim 11, wherein there is a delay time between turn-on of the third switch and turn-on of the fourth switch.

15. The power supply of claim 10, wherein the first phase of the switching cycle is an energy storing phase, and wherein the second phase of the switching cycle is an energy releasing phase.

* * * * *